United States Patent
Takamatsu et al.

(10) Patent No.: US 9,994,254 B2
(45) Date of Patent: *Jun. 12, 2018

(54) METHOD AND SYSTEM OF ASSISTING A DRIVER OF A VEHICLE

(71) Applicants: NISSAN NORTH AMERICA, INC., Franklin, TN (US); NISSAN MOTOR CO., LTD., Yokohama-shi Kanagawa (JP)

(72) Inventors: Yoshiro Takamatsu, Sunnyvale, CA (US); Yuji Takada, Sunnyvale, CA (US); Yoshinori Kusayanagi, Kamakura (JP); Norimasa Kishi, Yokohama (JP)

(73) Assignees: NISSAN NORTH AMERICA, INC., Franklin, TN (US); NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/329,888

(22) PCT Filed: Sep. 26, 2014

(86) PCT No.: PCT/US2014/057834
§ 371 (c)(1),
(2) Date: Jan. 27, 2017

(87) PCT Pub. No.: WO2016/048371
PCT Pub. Date: Mar. 31, 2016

(65) Prior Publication Data
US 2017/0282973 A1    Oct. 5, 2017

(51) Int. Cl.
*B62D 15/02* (2006.01)

(52) U.S. Cl.
CPC ....... *B62D 15/0265* (2013.01); *B62D 15/029* (2013.01)

(58) Field of Classification Search
CPC .................. B62D 15/0265; B62D 15/029; B62D 5/0466; B60W 50/0098; B60W 30/18145; G06K 9/4604
(Continued)

(56) References Cited

U.S. PATENT DOCUMENTS 7,765,066 B2 *   7/2010   Braeuchle ........... B60W 30/095
                                                                  382/103
8,836,492 B2 *   9/2014   Akiyama ........ B60W 30/18145
                                                                  340/436

(Continued)

OTHER PUBLICATIONS

Wu et al., The Heterogeneous Systems Integration Design and Implementation for Lane Keeping on a Vehicle, 2008, IEEE, p. 246-263.*

(Continued)

*Primary Examiner* — McDieunel Marc

(57) ABSTRACT

A method of assisting a driver of a vehicle in driving a road, the method includes obtaining a feature of a road using a sensor, selecting, via a controller, a parameter based on the feature of the road, determining, via a controller, whether the vehicle is approaching a boundary of the road, and providing a feedback operation to assist the driver in avoiding the boundary of the road, the feedback operation based on the selected parameter.

17 Claims, 7 Drawing Sheets

(58) Field of Classification Search
USPC .......................................................... 701/41
See application file for complete search history.

(56) References Cited

U.S. PATENT DOCUMENTS

| | | | |
|---|---|---|---|
| 9,227,635 B1* | 1/2016 | Takamatsu | B62D 5/0466 |
| 9,317,756 B2* | 4/2016 | Takemae | G06K 9/4604 |
| 9,586,593 B2* | 3/2017 | Takamatsu | B60W 50/0098 |
| 2002/0184236 A1 | 12/2002 | Donath et al. | |
| 2005/0228588 A1 | 10/2005 | Braeuchle et al. | |
| 2008/0033647 A1 | 2/2008 | Milark et al. | |
| 2009/0043473 A1 | 2/2009 | Nakai et al. | |
| 2011/0251758 A1 | 10/2011 | Kataoka | |
| 2013/0231830 A1 | 9/2013 | Van Don Elzen et al. | |
| 2014/0278031 A1 | 9/2014 | Scofield et al. | |

OTHER PUBLICATIONS

Lu et al., From Vehicle Stability Control to Intelligent Personal Minder: Real-time Vehicle Handling Limit Warning and Driver Style Characterization, 2009, IEEE, p. 1-8.*

McCall et al., Video-Based Lane Estimation and Tracking for Driver Assistance: Survey, System, and Evaluation, 2006, IEEE, p. 20-37.*

Cheng et al., Interactive Road Situation Analysis for Driver Assistance and Safety Warning Systems: Framework and Algorithms, 2007, IEEE, p. 157-167.*

International Search Report in PCT/US2014/057834 dated Dec. 31, 2014.

* cited by examiner

METHOD AND SYSTEM OF ASSISTING A DRIVER OF A VEHICLE

BACKGROUND

Field of the Invention

This application is a U.S. National stage application of International Application No. PCT/US2014/057834, filed Sep. 26, 2014.

The present invention generally relates to a method and system of assisting a driver of a vehicle. More specifically, the present invention relates to a method and system disposed in a vehicle that provides a feedback operation to assist a driver in avoiding a road boundary 28 based on selected parameters.

Background Information

Conventional technology exists that assists a driver of vehicle in recognizing the environment surrounding a vehicle. In one such system, the lane departure tendency of the vehicle is detected based on a lane dividing line or lane border and a future position of the vehicle after a predetermined time period is calculated. If the system determines that lane departure is imminent, the system controls the vehicle to move in such a direction that lane departure is prevented. See e.g., Japanese Patent Unexamined Publication No. 2000-33860.

SUMMARY

It has been discovered that in driver assistance systems providing feedback to the driver of the vehicle based on the location of the vehicle along a road, features of the road and parameters is desirable. For example, when traveling on a road (e.g., a narrow road or a busy multilane road), a driver may be uncomfortable with the distance between the vehicle and the road boundary. In such situations, each individual driver may desire a specific distance between the road boundary and the vehicle.

In view of the state of the known technology, one aspect of the present disclosure is to provide feedback to the driver based on the distance to the boundary and a driver's individual skill and preference, and other desired parameters or factors. In one disclosed embodiment, a method of assisting a driver of a vehicle in driving a road, the method includes obtaining a feature of a road using a sensor, selecting, via a controller, a parameter based on the feature of the road, determining, via a controller, whether the vehicle is approaching a boundary of the road, and providing a feedback operation to assist the driver in avoiding the boundary of the road, the feedback operation based on the selected parameter.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The disclosed embodiments are for a driver assistance system 12 that applies a feedback operation to a host vehicle 10 when traveling along a road 26. It is noted that driver assistance system 12 may be used in a non-autonomous vehicle, or an autonomous vehicle, as desired. The controller 14 of the driver assistance system 12 can adjust the timing and the amount and type of a feedback operation to improve driver comfort.

Figure 1:
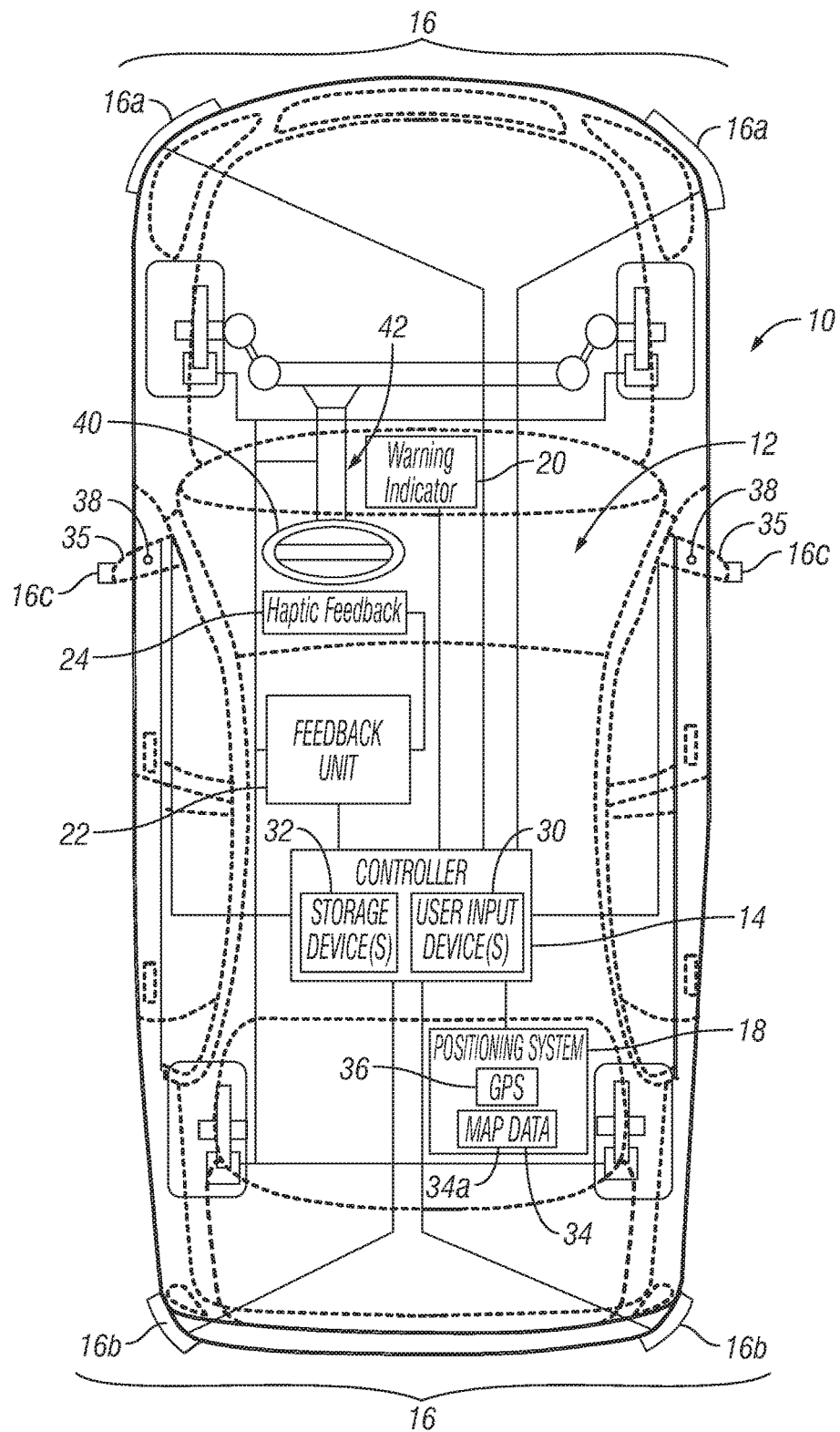
FIG. 1 is a schematic top view of an vehicle having a driver assistance system according to one embodiment.

Referring initially to FIG. 1, a driver assistance system 12 for a host vehicle 10 is illustrated in accordance with one embodiment. The driver assistance system 12 includes a controller 14, sensor system 16, a positioning system 18, a warning indicator 20 or system, a feedback unit 22 and a haptic feedback 24.

The controller 14 preferably includes a microcomputer with a control program that controls the driver assistance system 12 as discussed below. The controller 14 can also include other conventional components such as an input interface circuit, an output interface circuit, and storage device(s) 32 such as a ROM (Read Only Memory) device and a RAM (Random Access Memory) device. The microcomputer of the controller 14 is programmed to control one or more of the sensor system 16, the positioning system 18, the warning indicator 20 or system, the feedback unit 22 and the haptic feedback 24, and to make determinations or decisions, as discussed herein. The memory circuit stores processing results and control programs, such as ones for the sensor system 16, the positioning system 18, the warning indicator 20 or system, the feedback unit 22 and the haptic feedback 24 operation that are run by the processor circuit. The controller 14 is operatively coupled to the sensor system 16, the positioning system 18, the warning indicator 20 or system, the feedback unit 22 and the haptic feedback 24 in a conventional manner, as well as other electrical systems in the vehicle 10, such the turn signals, windshield wipers, lights and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the detection system in accordance with the control program. It will be apparent to those skilled in the art from this disclosure that the precise structure and algorithms for the controller 14 can be any combination of hardware and software that will carry out the functions of the present invention.

As shown in FIG. 1, the controller 14 can include or be in communication with user input devices 30. The user input devices 30 can include, for example, a human-machine interface (HMI) which enables a user (e.g., the driver and/or passenger) to interact with the driver assistance system 12 as understood in the art and discussed herein. The controller 14 can further include or be in communication with one or more storage device(s) 32 which can store information as discussed herein.

In one embodiment, the sensor system 16 can include proximity sensors and optical sensors. In one embodiment, the proximity sensors include a plurality of sensors, and are configured to detect the boundary 28 of the road 26 or other stationary or moving objects in proximity to the sensor system 16. For example, as illustrated in FIG. 1, front sensors 16a in the sensor system 16 are preferably mounted externally on the front bumper and rear sensors 16b are mounted externally on the rear bumper of host vehicle 10. However, the sensors in the sensor system 16 may be mounted on any suitable external portion of the host vehicle 10, including the front and rear quarter panels, the external mirrors or any combination of suitable areas.

The sensor system 16 is preferably configured to be capable of detecting a boundary 28 of a lane or a road 26 or other stationary or moving objects. However, the sensor system 16 can be any type of system desirable. For example, the front sensors 16a in the sensor system 16 can include a long-range radar device for detection in front of the host vehicle 10. The front radar sensor may be configured to detect objects at a predetermined distance (e.g., distances up to 200 m), and thus may have a narrow field of view angle (e.g., around) 15°. Due to the narrow field of view angle, the long range radar may not detect all objects in the front of the host vehicle 10. Thus, if desired, the front sensors 16a can include short-range radar devices to assist in monitoring the region in front of the host vehicle 10. The rear sensors 16b may include short-range radar devices to assist in monitoring objects behind the host vehicle 10. However, the sensors in the sensor system 16 can be disposed in any position of the host vehicle 10 and may include any type and/or combination of sensors to enable detection of a remote vehicle 10 in the threat zone. In addition, the sensor system 16 may include cameras 16b (e.g., mounted on the mirrors 35), radar sensors, photo sensors or any combination thereof. Although FIG. 1 illustrates four sensor sensors 16a and 16b and two cameras 16c, there can be as few or as many sensors desirable or suitable.

Although the sensor system 16 can electronic detection devices that transmit either electronic electromagnetic waves (e.g., radar), the sensors can be any suitable sensors that, for example, take computer-processed images with a digital camera and analyzes the images or emit lasers, as is known in the art. The sensor system 16 may be capable of detecting at least the speed, direction, yaw, acceleration and distance of the host vehicle 10 relative to the boundary 28 of the road 26 or other stationary or moving objects. Further, the sensor system 16 may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicle 10s. The sensor system 16 is in communication with the controller 14, and is capable of transmitting information to the controller 14.

Additionally, the sensor system 16 is capable of determining the distance from the left, right, front and rear of the vehicle 10 to a road boundary 28 or other stationary or moving objects. For example, the sensor system 16 is capable of detecting the road boundary 28, such as a curb, lane marker, etc., or other stationary or moving objects to the left and right of the vehicle 10. Additionally, the sensor system 16 can include internal sensors capable of determining the steering wheel angle, the steering wheel angular speed and the vehicle speed along the road 26. Based on this information, the controller 14 is capable of calculating the relative position, relative speed, angle of the vehicle 10 relative to the road boundary 28, and estimated future position of the host vehicle 10.

The driver assistance system 12 may include a positing system 18, such as a GPS 36. In one embodiment the vehicle 10 receives a GPS satellite signal. As is understood, the GPS 36 processes the GPS satellite signal to determine positional information (such as location, speed, acceleration, yaw, and direction, just to name a few) of the vehicle 10. As noted herein, the positioning system 18 is in communication with the controller 14, and is capable of transmitting such positional information regarding the vehicle 10 to the controller 14.

The positioning system 18 also can include a storage device 34 that stores map data 34a. Thus, in determining the position of the vehicle 10 using any of the herein described methods, devices or systems, the positioning of the vehicle 10 may be compared to the known data stored in the storage device 34. Thus, the driver assistance system 12 may accurately determine the location of the host vehicle 10 on an electronic map. The storage device 34 may also store any additional information including the current or predicted vehicle 10 position and any past vehicle 10 position or any other suitable information.

The warning indicator 20 may include warning lights and/or a warning audio output and is in communication with the controller 14. For example, the warning indicator 20 may include a visual display or light indicator that flashes or illuminates the instrument cluster on the instrument panel of the host vehicle 10, activates a heads-up display is a visual readout in an information display unit, is an audible noise emitted from speaker, or any other suitable visual display or audio or sound indicator or combination thereof that notifies the driver or interior occupant of the host vehicle 10 that the distance between the vehicle 10 and the road boundary 28 is below a predetermined threshold. Further, in one embodiment, the warning indicator 20 includes a visual indicator 38 or light on the housing of the external mirror 35, or any other suitable portion of the external mirror or portion of the vehicle 10.

As shown in FIG. 1, the feedback unit 22 may include tactile feedback generated by the haptic feedback 24 that can be a vibration actuator in the steering wheel, the driver seat, or any other suitable location within the host vehicle 10. That is, the feedback operation can include providing haptic feedback 24 to a portion of an interior of the vehicle 10 located proximate to the driver. For example, the feedback operation may be a feedback force within the steering system that notifies the driver that the steering wheel 40 should be turned in a specific direction. Such a feedback operation does not necessarily need to alter the trajectory of the vehicle 10 but may be a minor turn of the steering wheel simply to notify the driver that a steering wheel operation is necessary. The feedback unit 22 can thus provide feedback to the driver based on a predetermined set of criteria. The feedback unit 22 is connected to the controller 14, which is programmed to operate the feedback unit 22 to warn the driver or control the vehicle 10.

Additionally, the feedback unit 22 may also be connected to the steering system 42 of the vehicle 10, such that the controller 14 can control the steering system 42 of the vehicle 10 based on a predetermined set of criteria. The feedback unit 22 can be connected to the steering wheel 40 or any other suitable portion of the steering system 42. That is, the feedback unit 22 can apply an assist force to a portion of the steering system 42 of the vehicle 10 to cause movement of the vehicle 10 away from the boundary 28.

Figure 2:
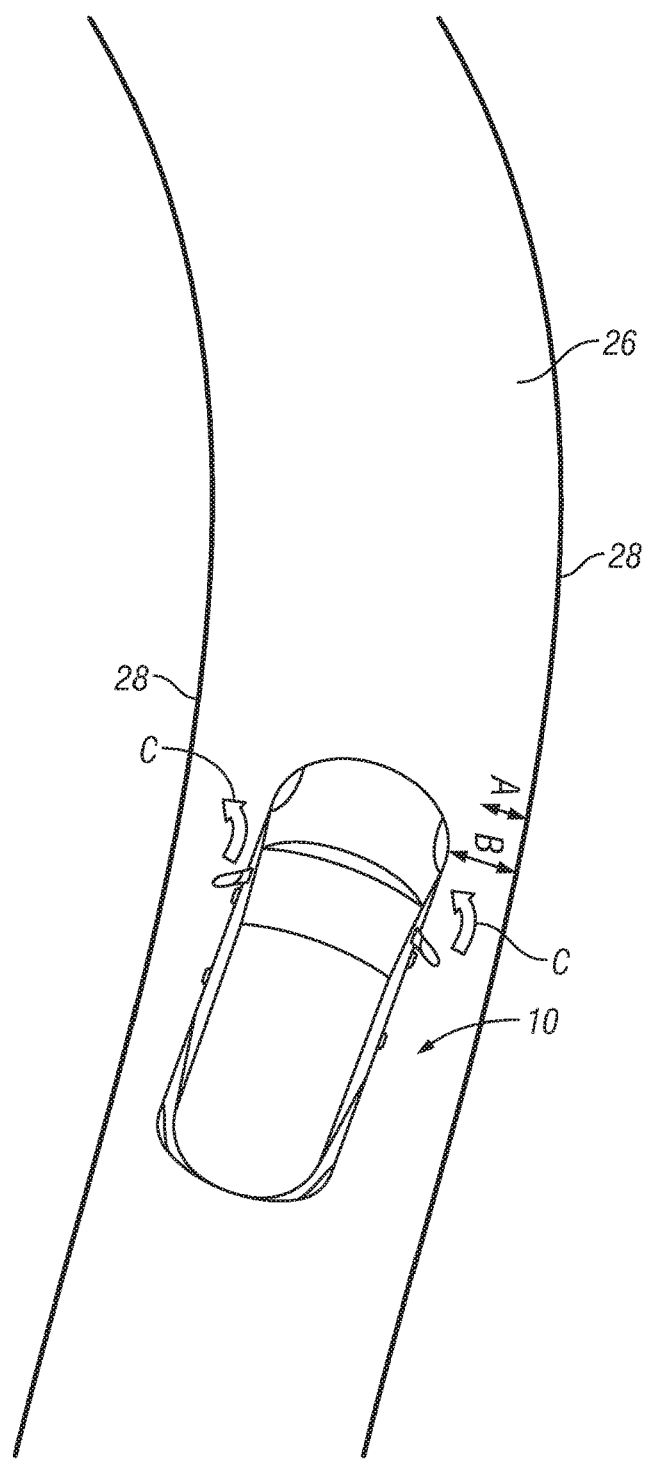
FIG. 2 is a schematic top view of a vehicle having the driver assistance system illustrated in FIG. 1 traveling along a road.
Figure 3:
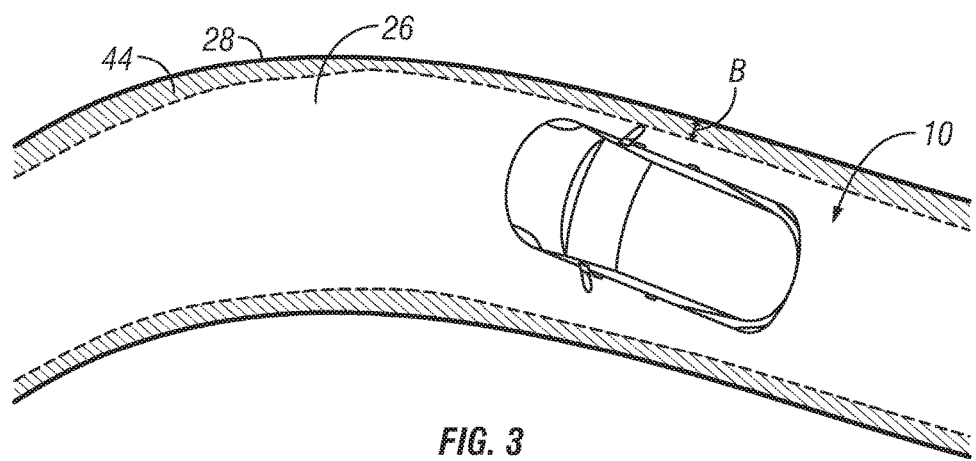
FIG. 3 is a schematic top view of a vehicle having the driver assistance system illustrated in FIG. 1 with a representation of a first calculated threshold distance between the vehicle and the road boundary.
Figure 4:
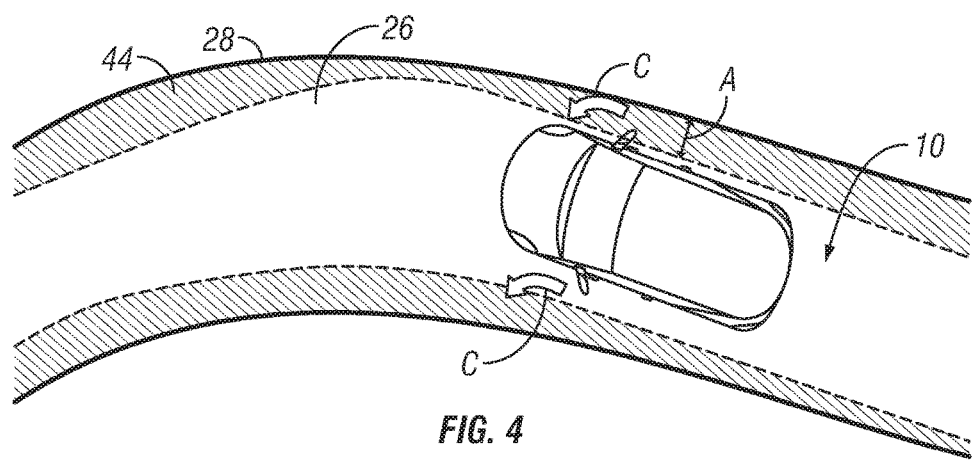
FIG. 4 is a schematic top view of a vehicle having the driver assistance system illustrated in FIG. 1 with a representation of a second calculated threshold distance and a representation of the assist force applied to the vehicle.

Turning to FIGS. 2 to 4, the host vehicle 10 is illustrated traveling along a road 26. As one of ordinary skill will understand, every driver may have a different comfort level as to how close the host vehicle 10 can approach a road boundary 28 (e.g., a curb, a wall, a lane marker, or other road boundary 28) when traveling along the road 26. Therefore, the driver assistance system 12 is capable of notifying the driver or altering the trajectory of the host vehicle 10, so as to avoid the road boundary 28. Moreover, the host vehicle 10 may need to change the distance to the road boundary 28 depending on a passing vehicle 10, a pedestrian, a construction/work zone, a change in the road 26 (or lane) width, or any other possible scenario. Thus, it is clear that based on the identity of the driver or certain circumstances on the road 26, the host vehicle 10 is capable of adapting to a variety of acceptable distances to an established road boundary 28.

As shown in FIGS. 2 and 3, one driver may be comfortable having the host vehicle 10 approach a road boundary 28 at a distance B, while, as shown in FIGS. 2 and 4, another driver may be comfortable having the host vehicle 10 approach a road boundary 28 at a distance A. That is, one driver (e.g., driver B) may not be comfortable approaching the road boundary 28 at the same distance as another driver (e.g., driver A). In this embodiment, driver A is generally more comfortable approaching the road boundary 28 at a closer threshold distance 44 than driver B; however, the distances may vary along the road 26, and while one driver may generally approach the road boundary 28 at less of a distance than another driver, the threshold distances 44 for each driver may change at any portion along the road 26.

Thus, the controller 14 can adjust the timing of an assist force or warning dependent upon the preferences of the driver and specific circumstances of the road 26. In other words, the controller 14 may activate a tactile and/or visual warning from the warning indicator 20 in the compartment of the vehicle 10 and/or alter the direction and/or speed of the vehicle 10 based on the preferred threshold distance 44 from the road boundary 28 for each vehicle 10 driver in each specific circumstance. As shown by the arrows C, in FIGS. 2 and 4, the controller 14 can alter the direction on the vehicle away from the road boundary 28. This alteration of trajectory can be accomplished by turning the wheels of the host vehicle 10.

Figure 5:
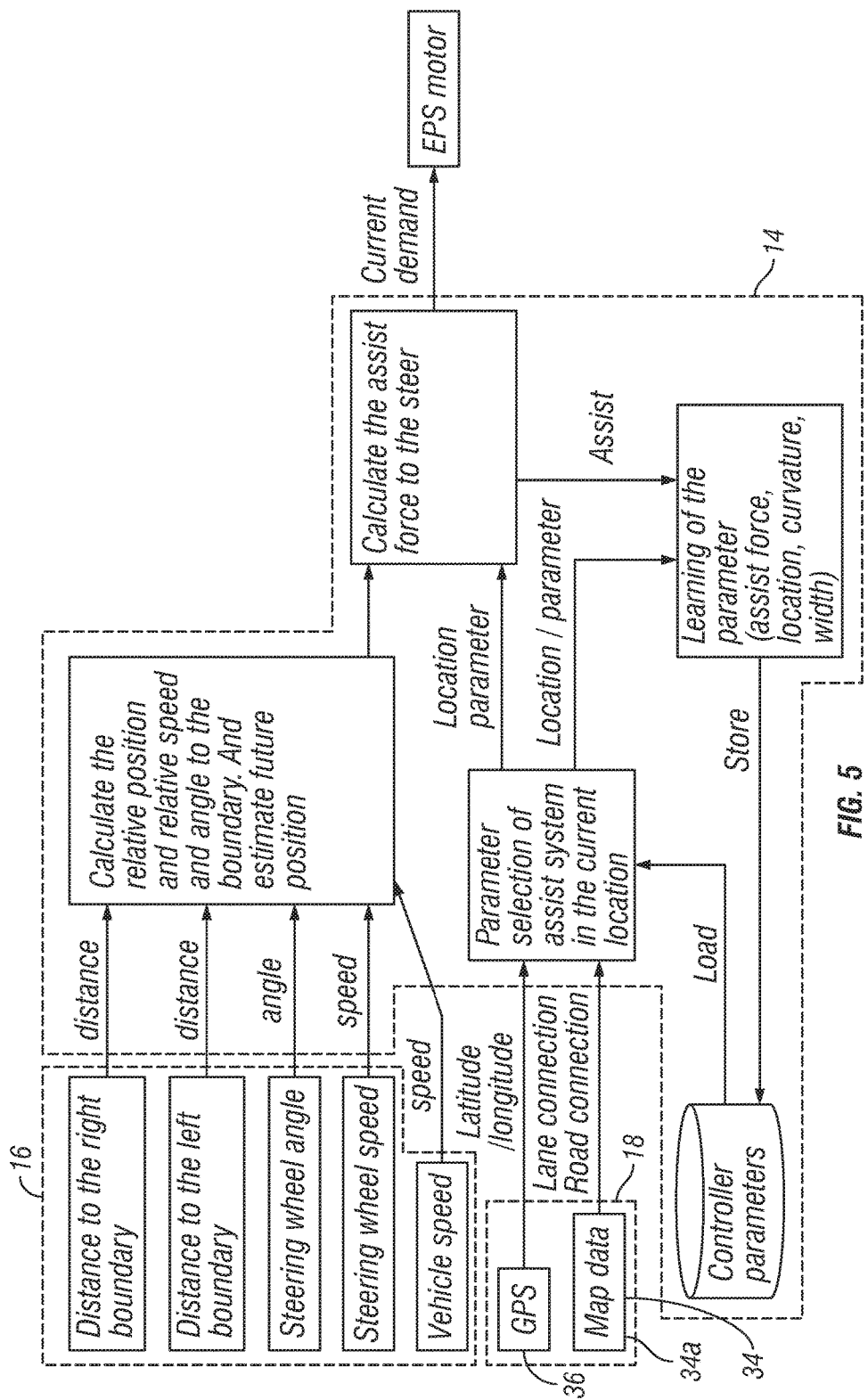
FIG. 5 is a schematic representation of the driver assistance system according to one embodiment of the present invention.

Thus, as shown in FIG. 5, the sensor system 16 sense a road boundary 28 on the left and right sides of the vehicle 10 and transmit this information to the controller 14. The driver assistance system 12 can also determine the steering wheel angle, the steering wheel angular velocity and the vehicle 10 speed for each position along the road 26. This information is communicated to the controller 14. The controller 14 calculates the relative position, relative speed, angle of the vehicle 10 relative to the road boundary 28, and estimates the likely future position of the host vehicle 10 based on these variables.

The GPS 36 determines the latitude and longitude of the host vehicle 10 and, along with the map data 34a stored in the storage device 34, the location of the host vehicle 10 on a map (e.g., the road 26 and lane) is determined. Based on the determination of the host vehicle 10 location, a parameter is selected. That is, based on a condition, a parameter to assist a driver of the vehicle 10 when approaching the location of the road boundary 28. The condition can be the identity of the driver, location of the host vehicle 10 relative to the road boundary 28, the speed of the vehicle 10 angle of the vehicle 10 relative to the road boundary 28, and/or the estimated future position of the host vehicle 10. For example, in one embodiment, the controller 14 can then select a parameter based on the current location of the host vehicle 10 and the specific driver (i.e., identity of the driver).

Additionally, the GPS 36 and the sensor system 16 are capable of determining features of the road 26. For example, the GPS 36 and the sensor system 16 can determine the curvature of the road 26, the gradient of the road 26, the width of the road 26, and a presence of an object in the road 26. In one embodiment, the sensor system 16 can determine aspects of the road 26 based on the dimension and location and comparison to known stored information or map data. Thus, when selecting the parameter from a plurality of parameters, the controller 14 can compare the feature of the road 26 to a plurality of the stored feature values in the plurality of parameters, when the feature of the road 26 that corresponds to a predetermined stored feature of the plurality of stored features. The features of the road 26 can be weighted, such that one feature is weighted more than another feature. Moreover, the controller 14 can determine a correspondence between the feature on the road 26 the stored feature using at least one static obstacle position along the road 26.

The parameter can be one or more of a distance threshold, an assist force threshold, and a feedback force gradient. In other words, the parameter can be a distance of the host vehicle 10 to the road boundary 28, the amount of torque for assist force to apply to the steering system and/or a predetermined increase or decrease in the assist force.

The parameter can also be a particular segment of the road 26, the trajectory of the host vehicle 10 during a previous driving operation of the host vehicle 10 on the road 26, a latitude and longitude location of the host vehicle 10 during a previous driving operation of the host vehicle 10, distance information about the location of the road boundary 28 with respect to the road 26 based on a previous driving operation of the vehicle 10 on the road 26.

In one embodiment, the parameter can be a plurality of values corresponding to a plurality of boundary 28 locations along the segment of the road 26. For example, the plurality of values can be distance thresholds for a plurality of boundary 28 locations along the segment of the road 26, the latitude and longitude information for the plurality of boundary 28 locations along the segment of the road 26 segment, weather information for the plurality of boundary 28 locations along the segment of the road 26, time of day information for the plurality of boundary 28 locations along the segment of the road 26, a position of at least one other vehicle 10 for the plurality of boundary 28 locations along the segment of the road 26, traffic information for the plurality of boundary 28 locations along the segment of the road 26, a position of at least one static object for the plurality of boundary 28 locations along the segment of the road 26, a width of a lane for the plurality of boundary 28 locations along the segment of the road 26, and a number of lanes for the plurality of boundary 28 locations along the segment of the road 26.

Additionally, if desired, the parameter can be a plurality of parameters. That is, the driver assistance system 12 can store a plurality of parameters in the storage device 32. The controller 14 can select one parameter or any combination of parameters from the plurality of parameters.

In one embodiment, the controller 14 calculates the torque for the assist force using at least one of the distance to the boundary 28, an angle of the host vehicle 10 relative to the boundary 28, a curvature of the road 26, and/or using estimated values for the distance of the vehicle 10 to the road boundary 28, angle of the vehicle 10 relative to the road boundary 28, and the estimated curvature of the road 26 at a predetermined period of time. The estimated values can be based on the GPS and the sensor system 16 or based on real time information or stored information. Based on at least one of these factors, the controller 14 determines the amount of torque to apply to the steering wheel. For example, when the distance to the road boundary 28 is minimal, the angle of the car relative to the boundary 28 is high and the curvature of the road 26 is high, the controller 14 may determine that a large assist force (i.e., large torque) needs to be applied to the steering system. In this situation, the controller 14 would then apply a large assist force to avoid the road boundary 28.

The parameters can be stored in one or more storage devices 32 in the driver assistance system 12. In one embodiment, the parameter can be manually selected by a user. For example, the driver may determine that driver assistance should be set such that the controller 14 will issue feedback or apply an assist force at a predetermined distance from a road boundary 28. The driver may manually set and store parameters using the user inputs.

Moreover, the parameters can change (or be manually changed) for each driver along a road and for each road. That is, the driver maybe comfortable at one distance from the road boundary 28 at a first portion of the road 26 and at another distance from the road boundary 28 at a second portion of the road 26.

The parameters for each driver at each specific position along the road 26 once calculated for each new position are stored in the storage device 32. Thus, the system is capable of learning the acceptable driving parameters for each driver. That is, the preference of the assist force, the vehicle 10 location relative the boundary 28 and along the road 26, the curvature of the road 26 at each position along the road 26, for each driver can be stored and updated on a continuous basis.

Further, the parameter can be updated based on a driving operation of the vehicle 10 on the road 26 and/or based on a condition of the steering system. The parameter can be updated based on previous roads or on previous travel along the current road 26, with respect to the road 26 based on the previous driving operation of the vehicle 10 on the road 26, with weather information during the previous driving operation of the vehicle 10 on the road 26, with a time of day during the previous driving operation of the vehicle 10 on the road 26, with a state of traffic state of the of the road 26 during the previous driving operation of the vehicle 10 on the road 26, with a position of other vehicle 10s on the road 26 during the previous driving operation of the vehicle 10 on the road 26, with a position of static objects proximal to the road 26 during the previous driving operation of the vehicle 10 on the road 26, with pedestrian status during the previous driving operation of the vehicle 10 on the road 26.

For example, during inclement weather, at night, during high traffic situations, or other situations, a specific driver may prefer difference distances from a road boundary 28 than at other situations. More specifically, a small distance from the road boundary 28 may be acceptable during the day, in clear weather with little traffic. However, a larger boundary 28 may be preferably at night, in the rain with significant traffic.

When traveling along the current road 26, the characteristics of a previous road (similar to the current road 26) or the current road 26 previously travelled (once or a plurality of times) and the driver preferences along each road 26 can be used to update the parameters for the current road 26. Moreover, any of the factors discussed herein can be stored and updated for each driver. Thus, ensuring that the most preferably parameters for each driver are available for the driver assistance system 12.

Further, the parameter can be related to a particular road or a particular segment of the road and can be stored based on latitude and longitude of the road of segment of the road. Thus, the controller 14 can identify the particular segment based on latitude and longitude and select the parameter based on this information. Further, when the road has been travelled multiple times, the controller 14 can calculate the parameter based on a statistical calculation of traveling the segment of the road the plurality times previously. That is, the statistical calculation can determine the average or mean for each parameter to determine the most preferable environment for the driver.

Thus, as the host vehicle 10 approaches a road boundary 28, the road boundary 28 is sensed by the sensor system 16, and the controller 14 determines whether the vehicle 10 is approaching the road boundary 28 and the location of the road boundary 28 relative to the host vehicle 10. The controller 14 determines this aspect based on a trajectory of the vehicle 10, the location of the host vehicle 10 relative to the road boundary 28, or in any other suitable manner.

In one embodiment, as the host vehicle 10 approaches the road boundary 28, the controller 14 determines that, based on the location of the host vehicle 10, driver preferences, and/or a feature of the road 26, a feedback operation to assist the driver in avoiding the road boundary 28 based on the selected parameter is necessary. The feature of the road 26 can be any desirable feature, such as one of or a plurality of the curvature of the road 26, the gradient of the road 26, the width of the road 26, and a presence of an object in the road 26. Thus, when selecting the parameter from a plurality of parameters, the controller 14 can compare the feature of the road 26 to a plurality of the stored feature values in the plurality of parameters. When the feature of the road 26 corresponds to a predetermined stored feature of the plurality of stored features, the controller 14 selects the appropriate parameter. The features of the road 26 can be weighted, such that one feature is weighted more than another feature. Moreover, the controller 14 can determine a correspondence between the feature on the road 26 the stored feature using at least one static obstacle position along the road 26.

In one embodiment, as discussed herein, the feedback operation is an assist force that is applied. That is, as the host vehicle 10 is approaching the road boundary 28 such that the host vehicle 10 has surpassed a distance threshold, the controller 14 determines that a feedback operation should be applied to assist the driver of the vehicle 10.

In one embodiment, the controller 14 calculates an assist force as the feedback operation. That is, the controller 14 determines, based on the location of the host vehicle 10, the speed of the host vehicle 10, the trajectory of the host vehicle 10, and/or the identity of the driver, that an assist force is necessary and the preferred torque of the assist force. The controller 14 then applies the assist force, using an electric power steering (EPS) motor to move the vehicle 10 wheels (and the steering wheel, if desired) to move the vehicle 10 away from the road boundary 28. In other words, in this embodiment, the feedback operation includes applying an assist force when a distance of the host vehicle 10 to the road boundary 28 is less than a distance threshold 44. Once the vehicle 10 is farther from the road boundary 28 that the distance threshold, the controller 14 terminates the assist force.

Alternatively, the controller 14 can cause a warning to be communicated to the driver. The warning can be a tactile warning through the steering wheel, the driver's seat or in any other suitable manner. Moreover, the warning can be a visual warning through a light or other device in the instrument panel or other portion of the vehicle 10, or the warning may be an auditory warning. The warning may be alone or in addition to the assist force applied by the EPS and can be any combination of tactile, visual and auditory.

As shown in FIG. 5, the calculation of the assist force is also used in learning the specific preferences of a parameter for a driver. This information is stored in a storage device 32 for later use for a specific driver.

Figure 6:
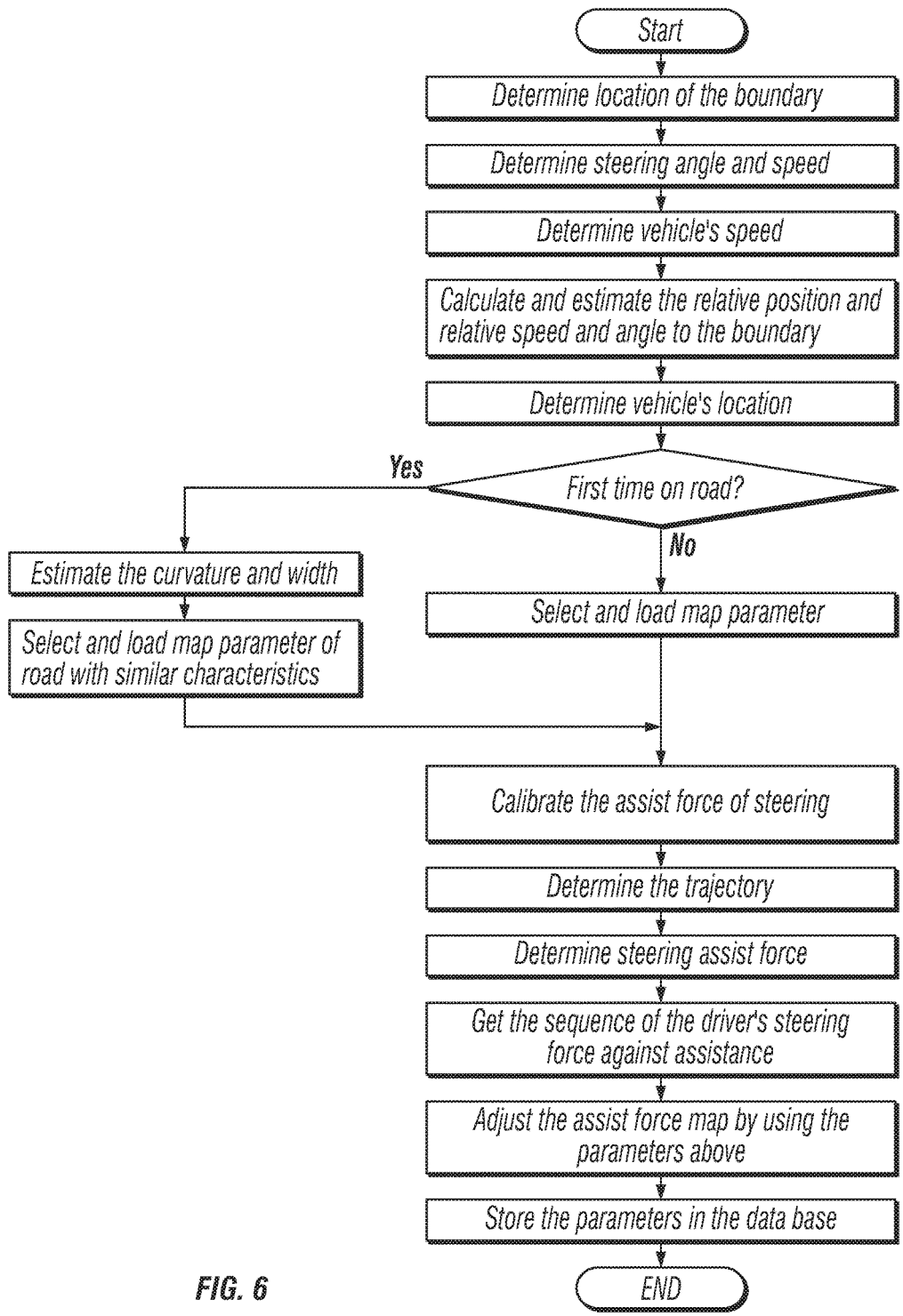
FIG. 6 is a flow chart illustrating the steps executed by the driver assistance system.

FIG. 6 illustrates one procedure for applying the driver assistance system 12. Initially, the sensor system 16 determine the location of the road boundary 28 relative to the host vehicle 10. This information is transmitted to the controller 14. The steering wheel angle and rotational speed are then determined, along with the speed of the vehicle 10. The relative position and relative speed and angle to the road boundary 28 are calculated and/or estimated to determine the host vehicle 10's location relative to the road boundary 28. The controller 14 then determines whether it is the first time the vehicle 10 has been on the current road 26. If it is the first time the vehicle 10 has been on the road 26, the controller 14 estimates the road curvature and width, and then selects and loads a parameter based on a road 26 having similar characteristics. If it is not the vehicle 10's first time on the road 26, the controller 14 selects and loads a parameter.

Further, as discussed above, if it is the host vehicle 10's first time traveling along the road 26, the characteristics of a previous road (similar to the current road 26) and the driver preferences along the previous road can be used to update the parameter for the current road. In this embodiment, parameter is selected or loaded prior to or while traveling along the current road.

The controller 14 then calibrates the assist force for the particular segment or portion of the road, and determines the trajectory of the host vehicle 10. The controller 14 can then determine the assist force necessary to move the vehicle 10 away from the boundary 28 without making the vehicle 10 driver and/or other occupants uncomfortable.

Moreover, the controller 14 can determine the sequence of the driver's steering force against the assist force and adjust the assist force parameter in the storage device 32 using this information. The new assist force, along with the parameters used to calculate the assist force can be stored in the storage device 32 for further use on the road at other times.

Then, as discussed above, the controller 14 can apply a feedback operation to assist the driver in avoiding the road boundary 28 or merely so that the driver is comfortable. The feedback operation can be the assist force or merely a warning to the driver.

Figure 7:
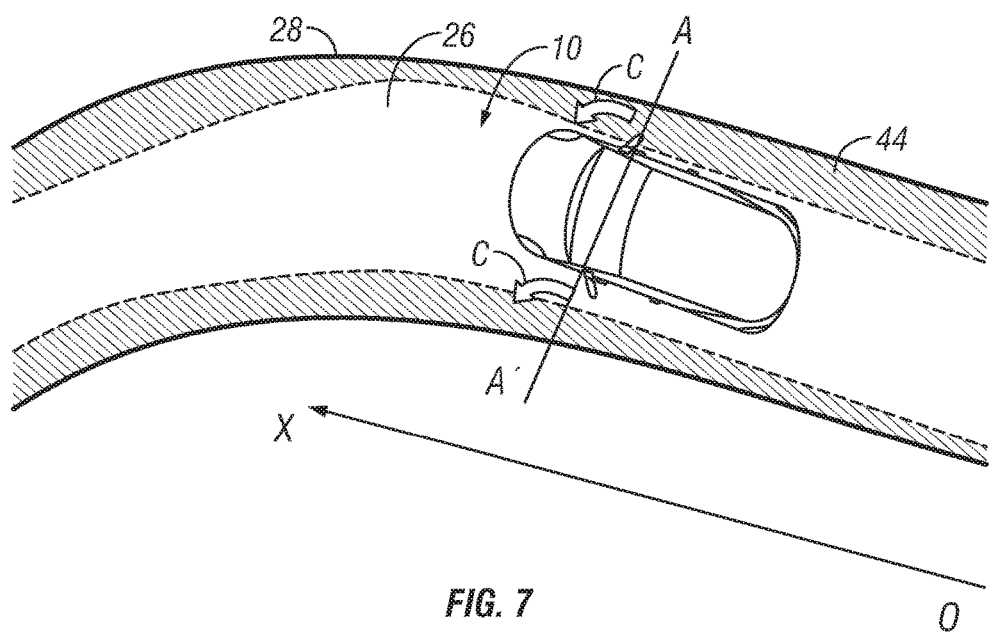
FIG. 7 is a schematic representation of the driver assistance system with the assist threshold varying along the road.
Figure 8:
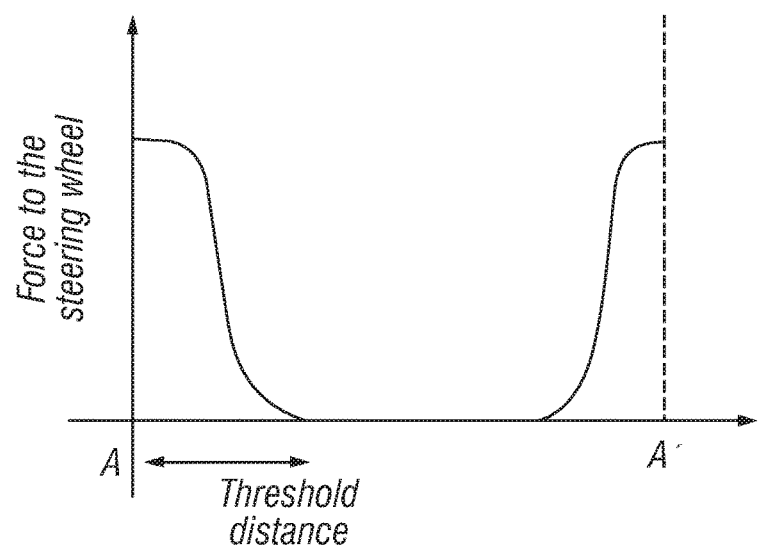
FIG. 8 is a graph illustrating the the assist force applied to the vehicle based on the distance from the road boundary.

As shown in FIGS. 7 and 8, the assist force can vary along the road 26. For example, the arrow indicated with X illustrates a distance along the road 26, and A indicates the host vehicle 10 position on the right side of the road 26, and A' indicates the host vehicle 10 position on the left side of the road 26. Thus, for predetermined positions along the road 26 the threshold distance can vary for each driver. Accordingly, based on at least one condition of a plurality of conditions (e.g., the distance along the road 26, the driver, the speed of the vehicle 10, the trajectory of the vehicle 10), the threshold distance 44 can be adjusted. Moreover, as the threshold distance 44 is adjusted the assist force can be adjusted by the controller 14. That is, the assist force may be reduced for certain locations along a road 26 or at certain vehicle 10 speeds. In one embodiment, for a specific driver, the driver assistance system 12 can store a table of threshold values in the storage device 32. See e.g., Table 1.

TABLE 1

PARAMETER TABLE

| X[m] | Threshold Distance |
| --- | --- |
| 5 | 0.4 |
| 10 | 0.5 |
| 15 | 0.6 |
| 20 | 0.7 |
| 25 | 0.7 |
| 30 | 0.9 |
| 35 | 0.6 |

Moreover, as shown in FIG. 8, as the host vehicle 10 approaches the road boundary 28 the assist force increases. That is, when the host vehicle 10 is significantly beyond the threshold, the controller 14 can apply a significant assist force to the steering wheel; however, when the host vehicle 10 is at or not significantly beyond the threshold distance 44, the controller 14 can apply a slight or small assist force. Thus, the trajectory of the host vehicle 10 is not significantly altered when significant alteration is not necessary.

The assist force can also be applied based on a previous user operation. That is, the assist force can be calculated using a predetermined period of time of a speed of a steering operation during previous driving maneuvers. For example, the time the steering is turned and angle that the steering wheel is turned in previous driving operations can be used to determine the assist force. When the speed of the steering operation during previous driving maneuvers increases, a predetermined period of time of applying the assist force is decreased. Additionally, the average speed of the driver operation (i.e., turn of the steering wheel) can be estimated by usual driving characteristics when the driver drives on a road 26 that is similar to the current road 26 with or without the assist force. Thus, the controller 14 can apply the assist force based previous driver characteristics.

Figure 9:
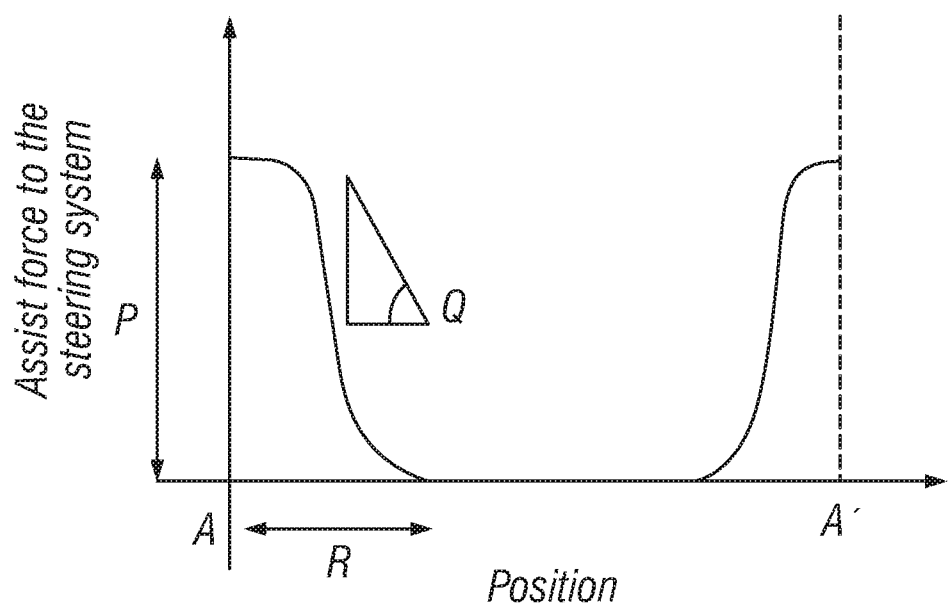
FIG. 9 is a graph illustrating the change in gradient of the assist force based on the distance from the boundary the maximum torque for a specific driver.

As illustrated in FIG. 9, the gradient Q of the assist force to the steering system can be adjusted for each specific driver of the host vehicle 10. That is, the controller sets the maximum assist torque for each driver based on the known characteristics of the driver and the threshold distance from the road boundary 28. That is, as specifically illustrated in FIG. 9, the gradient of the assist torque can be changed or modified the closer the host vehicle 10 is to the road boundary 28 (i.e., the position R of the host vehicle 10 relative to the road boundary 28) and the maximum amount of assist force P to be delivered to the steering system based on individual driver preference.

Further, as discussed above, based on the distance beyond the threshold distance 44 and the driver preference, the controller 14 may learn and adjust for each driver. That is, the preference of the assist force, the vehicle 10 location relative the boundary 28 and along the road 26, the curvature of the road 26 at each position along the road 26, for each driver can be stored and updated on a continuous basis.

Thus, as will be understood, the driver assistance system 12 as described herein will provide feedback to the driver based on the distance to the boundary 28 and a driver's individual skill and preference, and other desired parameters or factor. Accordingly, the driver experience and comfort level while driver along roads that may have significant traffic, narrow lanes or obstacles along the side of the road 26 will be improved.

The storage devices and GPS are conventional components that are well known in the art. Since storage devices and GPS are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "portion" when used in the singular can have the dual meaning of a single part or a plurality of parts. Also as used herein to describe the above embodiment(s), the following directional terms "front", "rear", "left", and "right" as well as any other similar directional terms refer to those directions of a vehicle equipped with the Method and System of Assisting a Driver of a Vehicle. Accordingly, these terms, as utilized to describe the present invention should be interpreted relative to a vehicle equipped with the Method and System of Assisting a Driver of a Vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of assisting a driver of a vehicle in driving a road, the method comprising:
   obtaining a feature of a road using a sensor;
   selecting, via a controller, a first parameter, including the identity of a driver of the vehicle, and a second parameter from among a plurality of stored parameters based on a correspondence between the feature of the road and a predetermined stored feature;
   determining, via the controller, whether the vehicle is approaching a boundary of the road; and
   providing a feedback operation to assist the driver in avoiding the boundary of the road, the feedback operation based on the selected first parameter and the second parameter.

2. The method of claim 1, wherein
the feature is a curvature of the road.

3. The method of claim 1, wherein
the feature is a gradient of the road.

4. The method of claim 1, wherein
the feature is a width of the road.

5. The method of claim 1, wherein
the feature is a presence of an object in the road.

6. The method of claim 1, wherein
the predetermined stored feature is one of a plurality of stored features in the plurality of parameters,
the selecting the second parameter further comprises comparing the feature of the road to the plurality of stored features and selecting the second parameter when the feature of the road corresponds to the predetermined stored feature.

7. The method of claim 6, wherein
each of the plurality of stored features is weighted.

8. The method of claim 6, wherein
correspondence between the predetermined stored feature of the plurality of stored features is based on static obstacle positions along the road.

9. The method of claim 6, wherein
correspondence between the predetermined stored feature of the plurality of stored features is determined by calculating a relative position of a static obstacle in the road.

10. The method of claim 1, further comprising
updating the second parameter based on the feature of the road, and selecting the updated parameter before traveling a second road.

11. The method of claim 1, wherein
the second parameter includes values that are related to a particular segment of the road.

12. The method of claim 11, wherein
the values related to the particular segment of the road are latitude and longitude of the particular segment of the road.

13. The method of claim 1, wherein
the second parameter includes a distance threshold, and
  the providing a feedback operation includes applying a feedback force when a distance of the vehicle to the road boundary is less than the distance threshold.

14. The method of claim 1, wherein
the providing the feedback operation includes providing haptic feedback to a portion of an interior of the vehicle located proximate to the driver.

15. The method of claim 1, wherein
the providing the feedback operation includes applying torque on a portion of a steering system of the vehicle to cause movement of the vehicle away from the boundary.

16. The method of claim 1, wherein
the boundary is at least one of a wall and a curb proximal to the road.

17. The method of claim 1, wherein
the boundary is a lane marker on the road.

\* \* \* \* \*